Feb. 23, 1965     B. L. R. FRYE     3,170,259
MICROFILM VIEWER

Filed Feb. 21, 1963     2 Sheets-Sheet 1

INVENTOR.
BURTON L. R. FRYE

BY

ATTORNEYS

Feb. 23, 1965    B. L. R. FRYE    3,170,259
MICROFILM VIEWER
Filed Feb. 21, 1963    2 Sheets-Sheet 2

INVENTOR.
BURTON L. R. FRYE
BY
ATTORNEYS

United States Patent Office 3,170,259
Patented Feb. 23, 1965

3,170,259
MICROFILM VIEWER
Burton L. R. Frye, 460 Foster Road, Napa, Calif.
Filed Feb. 21, 1963, Ser. No. 260,339
4 Claims. (Cl. 40—63)
(Granted under Title 35, U.S. Code (1952), sec. 266)

The invention described herein may be manufactured and used by or for the Government of the United States of America for governmental purposes without the payment of any royalties thereon or therefor.

The present invention relates to a microfilm viewer and more particularly to a portable, small-in-size microfilm viewer whose effective operation does not depend upon favorable extraneous environmental lighting.

The microfilming of documents initially was intended either to conserve space or for security purposes. More recently microfilming has come to be used as a means for mass distribution of active information and data. As with any other information-bearing medium, there is the considerable problem of locating and segregating the desired microfilm data from the gross lot of such microfilm-recorded data. This problem has been tackled by "wedding" a data-bearing microfilm section to the conventional data processing or punched card which is used with electronic computers. The otherwise-conventional data processing punched card is formed with an aperture therein and the data-bearing microfilm is affixed to the card so that its active information can be viewed via the aperture in the card. With the non-apertured balance of the data processing card appropriately punched with sufficient identification data relating to the subject matter contained in the affixed microfilm section, the information in the microfilm can be produced by automated retrieval. No existing film viewer was available to permit satisfactory reading of the microfilm contained on these punched cards and it was specifically to satisfy such a need that the present microfilm viewer was invented.

The primary object of the present invention is to produce a microfilm viewer for viewing microfilm inserts in a data processing card.

Other objects and many of the attendant advantages of this invention will be readily apparent upon consideration of the following specification and the annexed drawing in which.

Figure 1:
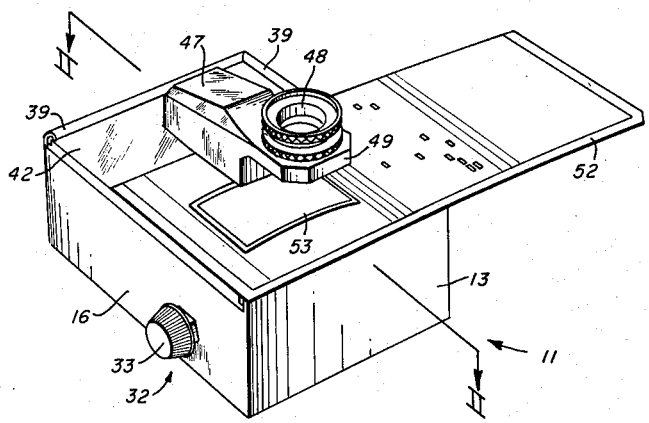
FIG. 1 shows the microfilm viewer with a representative microfilm-bearing data processing card in operative position for viewing of the film insert thereon.
Figure 2:
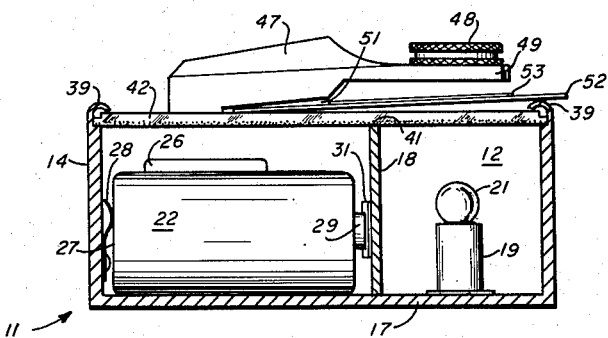
FIG. 2 is a vertical view as taken along line II—II of FIG. 1.

Referring now to the figures of the drawing, wherein corresponding parts are designated by the same reference numeral, there is seen a casing 11 formed of four walls 12, 13, 14 and 16, respectively, and a bottom 17. The boxlike chamber formed by the casing walls and bottom is split into two portions by a vertically-extending partition wall 18 which runs between walls 12 and 16, as shown, and is firmly fixed in place.

In the one compartment A, formed between walls 12, 13, 16 and partition wall 18, there is fixedly mounted to the bottom 17 a socket 19 which carries a lamp 21. In the other compartment B, formed between walls 12, 14, 16 and partition wall 18, there are located a pair of batteries 22 and 23 which serve as the source of power for energizing lamp 21.

These batteries 22 and 23 are held in operative position in compartment B by the respective action of a pair of resilient clips 24 and 26 each of which is firmly attached to the adjoining wall of compartment B and is curved in such a manner as to mate with the cylindrical surface of the battery which it contacts when said battery is in operative position. When both batteries 22 and 23 are in operative position in compartment B they abut each other as shown and each is held down by the resilient bias of its respective clip, this bias being directed inwardly toward its mating battery and downwardly toward bottom 17, as well. In addition to the constraint imposed against lateral movements of batteries 22 and 23 by the respective clips 24 and 26, each battery, when inserted into operative position in compartment B, sits with its bottom portion 27 in intimate contact with an electrically-conductive base 28 and its upper terminal 29 in contact with a resiliently-biased electrical lead member 31. Each cooperating base 28 and resiliently-biased electrical lead member 31 act in concert both to hold the battery therebetween against longitudinal shifting and to establish electrical contact with the opposite poles of the embraced battery and each is fixedly secured to a wall of the compartment B, as shown.

Figure 3:
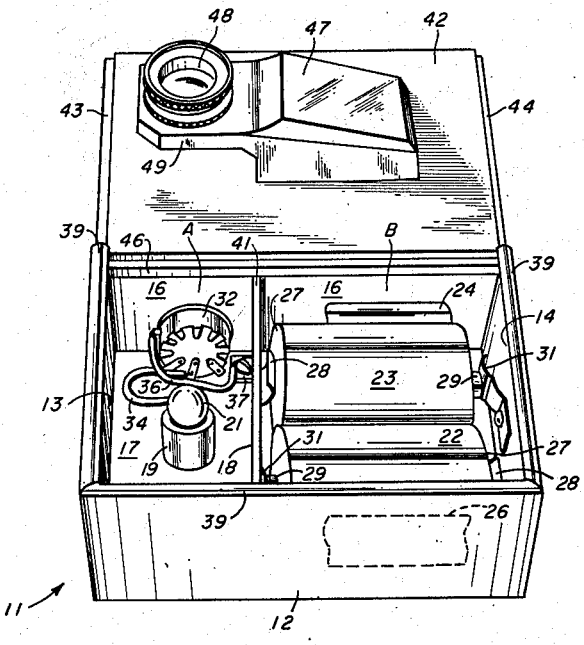
FIG. 3 shows the microfilm viewer with its top cover plate withdrawn from operative position, showing the electrical components structure within the microfilm casing.
Figure 4:
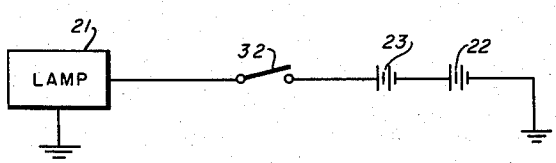
FIG. 4 is a schematic drawing of the electrical components of said microfilm viewer.

As shown schematically in FIG. 4 the batteries 22 and 23 are connected in series so as to double the voltage available from each and are connected in circuit with lamp 21 through a selector switch 32 which is shown in FIGS. 1 and 3, with the base of the switch 32 mounted in casing wall 16 and the operator-actuable knob 33 of the switch located on the outside of casing 11 for easy manipulation by an operator for turning lamp 21 on or off, as desired. Selector-switch 32 is connected to lamp 21 by lead 34 and to battery 23 by lead 36 via a contact plate 37. The entire electrical system, which encompasses lamp 21, selector-switch 32 and batteries 22 and 23, is conventional, with lamp socket 19 and battery 22 being considered "grounded" to close the circuit "loop." The electrical arrangement may be modified to have the batteries 22 and 23 in parallel (rather than in series) with each other, if each battery employed is of sufficient strength to adequately, by itself, energize lamp 21.

Each of the vertical walls 12, 13 and 14 of casing 11 is formed at its uppermost end with a horizontally-extending lip portion 39 which extends inwardly toward the central portion of the casing. These lip portions 39 are located at a vertical height (measuring from the bottom 17 of casing 11) which is somewhat higher than the top edge 41 of partition wall 18. These wall lip portions 39 act in concert with the top edge 41 of partition wall 18 to hold in place a sandblasted-plastic light-diffusion plate 42. This light-diffusion plate 42 is adapted to slide into place as a cover to casing 11 by riding on the top edge 41 of partition wall 18 with its edges 43 and 44 in sliding abutting contact with walls 13 and 14, respectively. When in operative position as a cover for casing 11, its inboard edge 46 will be in intimate contact with wall 12 and its side edges 43 and 44 in like contact with walls 13 and 14, respectively, and it will be constrained by the wall lip portions 39 and the top edge 41 of partition wall 18. To enable the light diffusion plate 42 to be inserted into "covering" position, wall 16 is limited in its vertical height to the height of the upper edge of partition wall 18 so that light-diffusion plate 42 can be readily inserted into place.

Light-diffusion plate 42 which is made of plastic has its undersurface roughened such as by sandblasting, or the like, so that it will readily diffuse the light coming from lamp 21 when light-diffusion plate 42 is in operative "covering" position on casing 11. The location of the roughened or "frosted" surface of light-diffusion plate 42 is not critical. Either a "frosted" top surface or a "frosted" lower surface (as shown herein) may be employed, for either will give sufficient diffusion to the light coming from lamp 21.

Mounted on the upper surface of light-diffusion plate 42 is a plastic supporting member 47 which both supports a magnifying lens 48 for enabling a viewer to view the microfilm therethrough and cooperates with the light-diffusion plate 42 to securely hold the microfilm-bearing data-processing card 52 in position for microfilm viewing. Magnifying lens 48 is mounted in a conventional manner to the outwardly extending end 49 of supporting member 47 and when light-diffusion plate 42 is in operative "closing" position over casing 11, the magnifying lens 48 will be located directly over lamp 21. The lower portion of supporting member 48 forms a V-shaped groove 51 with the top surface of light-diffusion plate 42. This V-shaped groove 51 is adapted to receive the apertured data processing card 52, which carries the microfilm 53 affixed over its aperture, and it holds the card 52 in place, thereby allowing the microfilm 53 to be located under magnifying lens 48 for viewing.

With data processing card 52, bearing the microfilm section 53, held in operative viewing position under lens 48 by the clamping action on the card 52 by V-shaped groove 51, a viewer by manipulating knob 33 can turn selector switch 32 to its "on" position thereby energizing lamp 21. With lamp 21 energized, its upwardly directed light will be diffused by plastic light-diffusion plate 42 to provide a highly uniform background field of illumination for microfilm section 53 which will enable easy viewing of the microfilm by a viewer peering through the magnifying lens 48. With the microfilm viewer provided with its own self-contained means for producing the background illumination field necessary to viewing of the microfilm, effective viewing of same will be independent of the given environmental lighting condition.

Obviously many modifications and variations of the present invention are possible in the light of the above teaching. It is intended to cover all changes and modifications of the embodiment set forth herein which do not constitute departures from the spirit and scope of the invention.

What is claimed is:

1. A portable microviewer for supporting and holding data cards and for illuminating and viewing translucent film mounted in a particular position on the cards, the microviewer comprising:

a rectilinear open-top casing formed of opaque vertical side walls and an opaque bottom wall, an opaque vertical partition wall dividing the casing interiorly into compartments, a light source in one of said compartments, light source power means in another compartment, control means for the light source, a surface-roughened translucent light-diffusing cover plate translucently and removably covering the entire open top of the casing, said side walls of the casing being formed at their upper ends with a horizontal track means for slidably receiving the cover plate, a card holding and viewing means carried by said cover plate, said holding and viewing means being formed with a body portion having a bottom surface secured at one end to the upper surface of said plate and having an unsecured extension of said bottom surface lying in close proximity to said upper surface of the plate for forming therewith a card-receiving slot, said holding and viewing means further being formed with a support flange projecting outwardly of the body portion over said casing light source compartment, and a magnifying lens carried by said support flange, said lens being so disposed as to be over said translucent film when said card is received in said slot.

2. The microviewer of claim 1 wherein said partition wall extends in the direction of the sliding movement of said plate and the upper edge of the partition wall provides a support for the plate.

3. The microviewer of claim 1 wherein said translucent cover plate is formed of acrylic plastic having a sand blasted surface.

4. The microviewer of claim 1 wherein said slot is substantially V-shaped for wedgedly receiving said cards.

References Cited by the Examiner
UNITED STATES PATENTS

| | | | |
|---|---|---|---|
| 1,095,874 | 5/14 | Jella et al. | 88—39 |
| 1,478,504 | 12/23 | Adler | 40—106.1 |
| 1,206,865 | 7/40 | David et al. | 40—106.1 |
| 3,065,668 | 11/62 | Laybourn | 88—39 |

FOREIGN PATENTS 568,391    4/45    Great Britain.

JEROME SCHNALL, *Primary Examiner.*